(12) United States Patent
Baldwin et al.

(10) Patent No.: US 7,132,662 B2
(45) Date of Patent: Nov. 7, 2006

(54) FLEXIBLE LIQUID-FILLED RADIATION DETECTOR SCINTILLATOR

(75) Inventors: Charles E. Baldwin, Florence, KY (US); Craig Carls, Dry Ridge, KY (US)

(73) Assignee: Ronan Engineering Company, Florence, KY (US)

( * ) Notice: Subject to any disclaimer, the term of this patent is extended or adjusted under 35 U.S.C. 154(b) by 0 days.

(21) Appl. No.: 10/810,144

(22) Filed: Mar. 26, 2004

(65) Prior Publication Data

US 2004/0251416 A1 Dec. 16, 2004

Related U.S. Application Data

(60) Provisional application No. 60/458,694, filed on Mar. 28, 2003.

(51) Int. Cl.
G01T 1/204 (2006.01)
(52) U.S. Cl. ............... 250/361 R; 250/357.1
(58) Field of Classification Search ............ 250/361 R, 250/357.1
See application file for complete search history.

(56) References Cited

U.S. PATENT DOCUMENTS

| | | | |
|---|---|---|---|
| 3,501,632 A * | 3/1970 | Kaminskas et al. ............ 378/52 |
| 3,717,760 A * | 2/1973 | Martin ........................ 378/52 |
| 3,995,934 A * | 12/1976 | Nath ........................... 385/125 |
| 4,286,839 A * | 9/1981 | Ilzig et al. ................... 362/552 |
| 4,471,223 A * | 9/1984 | Hurst et al. ............... 250/357.1 |
| 4,870,278 A * | 9/1989 | Leonardi-Cattolica et al. ........................ 250/357.1 |
| 5,061,849 A * | 10/1991 | Meisner et al. ............. 250/254 |
| 5,266,808 A * | 11/1993 | Siegmund et al. .......... 250/368 |
| 5,457,877 A * | 10/1995 | McDermott ................. 29/825 |
| 5,684,908 A | 11/1997 | Kross et al. |
| 5,859,946 A | 1/1999 | Wojcik et al. |
| 5,896,483 A | 4/1999 | Wojcik et al. |
| 6,198,103 B1 | 3/2001 | Houillion et al. |
| 6,407,390 B1 * | 6/2002 | Rozsa ................... 250/363.01 |
| 6,563,120 B1 | 5/2003 | Baldwin et al. |
| 2004/0051048 A1 * | 3/2004 | Murray et al. ......... 250/390.11 |

OTHER PUBLICATIONS

Majewski et al., Economical Detectors Based on Safe Liquid Scintillators, Nuclear Instruments and Methods in Physics Research, 1998, pp. 289-298, A 414, Elsevier Science B.V.

* cited by examiner

*Primary Examiner*—David Porta
*Assistant Examiner*—Shun Lee
(74) *Attorney, Agent, or Firm*—Frederick H. Gribbell, LLC (57) ABSTRACT

A flexible scintillation-type level detector (10), in which the scintillator (18) is made from a flexible tube (12) substantially filled with a liquid scintillating material (16) to provide flexibility in at least two, and preferably three, dimensions. At least one end (32) is aligned for operable connection to a photodetector (14, 20). Outer surfaces of the flexible tube (12) may be covered with an inwardly-facing light reflective material (30) and/or light-excluding material or flexible armored casing(22). The scintillator (18) may include a variable-volume expansion chamber (110, 152, 176) to compensate for thermal expansion and contraction of the liquid scintillator material (16).

5 Claims, 9 Drawing Sheets

FLEXIBLE LIQUID-FILLED RADIATION DETECTOR SCINTILLATOR

RELATED APPLICATION

This application is based and claims priority on U.S. Provisional Patent Application Ser. No. 60/458,694, filed Mar. 28, 2003.

TECHNICAL FIELD

This invention relates to a radiation detector having a flexible scintillator for use with a nuclear (radiation-type) level detector. More particularly, the invention relates to the implementation of a flexible scintillator made of liquid scintillation material in a flexible tube which may be operably connected at an end to a photodetector.

BACKGROUND OF THE INVENTION

It is well known to use the combination of a radiation source, such as Cesium$^{137}$ and an elongated radiation detector as a device for measuring the level of material, such as in a tank, that is situated between the radiation source and radiation detector. Such devices are particularly useful when the material being measured or the environment in which it is located are particularly caustic, dangerous, or otherwise not amenable to traditional level measurement devices.

Early continuous level detection devices used an ion chamber detector. For example, the ion chamber could be a three to six inch (7.5–15 cm) diameter tube up to 20 feet (6 meters) long filled with inert gas pressurized to several atmospheres. A small bias voltage is applied to a large electrode inserted down the center of the ion chamber. As gamma energy strikes the chamber, a very small signal (measured in picoamperes) is detected as the inert gas is ionized. This current, which is proportional to the amount of gamma radiation received by the detector, is amplified and transmitted as the level measurement signal.

Alternatively, elongated scintillation detector "crystals" have been used. Such devices are many times more sensitive than ion chambers and are also considerably more expensive. This added expense is often acceptable because it allows the use of either a smaller radiation source size or to obtain a more sensitive gauge. When gamma energy hits the scintillator material, it is converted into invisible or UV flashes comprised of light photons (particles of light). These photons increase in number as the intensity of gamma radiation increases. The photons travel through the scintillator medium to a photomultiplier tube, which converts the light photons into an electrical signal. The output is directly proportional to the gamma energy that is striking the scintillator.

Both ion chamber detectors and scintillation counter detectors have the disadvantage of being quite rigid in structure. In some applications, such as extending the detector vertically around a horizontally-oriented tank or along the length of a tank where the shape of the tank or obstructions which are on or part of the tank limit or prevent the use of such rigid detectors. There is a need for a scintillation counter detector that is flexible so that it may be adapted in the field to bend around such obstacles.

Figure 1:
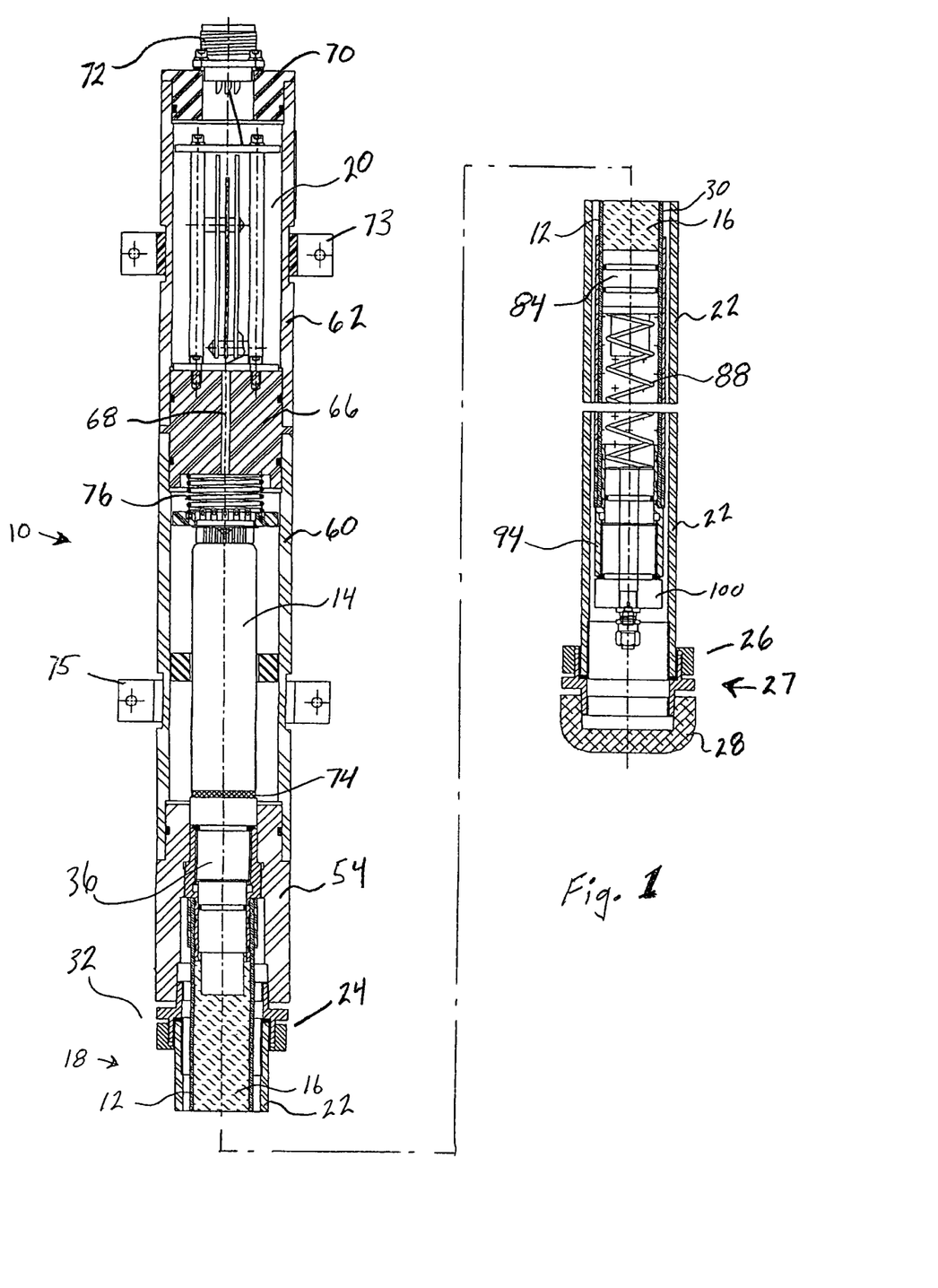
FIG. 1 is a segmented longitudinal sectional view of a radiation-type level detector which includes a flexible liquid scintillator according to a preferred embodiment of the invention.

Fiber optic cables made of many individually clad strands of scintillation material have been presented as a solution to this problem. An example of this is shown in U.S. Pat. No. 6,198,103. The required individual cladding of these fibers, however, makes such a solution undesirably costly. Another example of a flexible scintillation crystal detector is shown in our U.S. Pat. No. 6,563,120, issued May 13, 2003. In these detector systems, the radiation source is positioned outside the container, the scintillation detector is positioned outside the container, and the product having its level being detected is within the chamber, as illustrated in FIG. 1 of the above-noted U.S. Pat. No. 6,198,103. The quantity of radiation received by the scintillation detector is an indication of the level of the product within the container.

SUMMARY OF THE INVENTION

The present invention provides a flexible radiation-type level detector in which an elongated flexible tube is filled with liquid scintillator material. The tube has first and second ends, at least one of which is aligned for operable connection to a photodetector. Such a scintillator is flexible in three dimensions.

BRIEF DESCRIPTION OF THE DRAWING

Like-reference numerals are used to represent like parts throughout the various figures of the drawing, wherein.

BEST MODE FOR CARRYING OUT THE INVENTION

Referring now to the various figures of the drawing, and first to FIG. 1, therein is shown at 10 a flexible radiation-type level detector according to one preferred embodiment of the present invention. The device 10 includes a flexible tube 12 operably connected at an end to a photo multiplier tube 14 which acts as a photodetector. The flexible tube 12 includes a liquid scintillator material 16 which, when hit with gamma energy, produces flashes comprised of light photons (particles of light), typically in the UV spectrum. The tube 12, substantially filled with liquid scintillation material 16, comprises the scintillator 18, collectively. The scintillator 18 is operably connected to a photo multiplier tube 14 of well-known construction. The level of light photons produced by the scintillator 18 is directly proportional to the gamma energy that is striking the liquid scintillation material 16. Likewise, the output of the photo multiplier tube 14 is directly proportional to the number of photons it detects from the scintillator 18. The device 10 further may include an electronic amplifier 20, also of well-known construction, which produces a signal output in 10 volt pulses.

In preferred form, the flexible tube 12 may be made from any of a variety of materials having sufficient flexibility, strength and chemical resistence to the liquid scintillation material 16 being used. A one inch (2.54 cm) inside diameter is preferred, but tubing from one-fourth inch (0.635 cm) to four inches (10 cm) inside diameter may be employed for various applications. A preferred tubing material is a fluoropolymer plastic that sold by Norton Performance Plastics Corporation, of Wayne, N.J. under the trademark CHEMFLUOR. It has been found that CHEMFLUOR formulation 367 in one inch (2.54 cm) inside diameter has the desired index of refraction and internally smooth walls to enhance internal reflection. An acceptable fluoropolymer tubing is also sold by the same company under the trademark TYGON.

A large variety of liquid scintillation material is available from either Bicron Business Unit (d.b.a. Bicron) of Saint-Gobain Industrial Ceramics, Inc. in Newbury, Ohio or Eljen Technology of Sweetwater, Tex. Acceptable materials manufactured by Bicron are sold under the catalog listing BC-599-16, BC-517H, or BC-517L. Acceptable materials made by Elgin Technology are denoted EJ-321H or any of the EJ-399 series (04, 06, 08, 09). In selecting a liquid scintillation material, one should choose the desired balance between light output and flash point. That is, some material having a lower flash point (74° C.–81° C.) have higher light output (66%–52%, respectively). Materials having a higher flash point (>150° C.) provide lower light output (50%). If a higher flash point is required due to the environment in which the device 10 will be used, the choices of liquid scintillation material are more limited. For this reason, use of the Bicron BC-599-16 product, having a flash point of 167.1° C., is preferred.

All of the examples of liquid scintillation material described above have a refractive index greater than the refractive index of the tubing 12. These liquid scintillation materials typically emit light in the range of 425 nm. This range is easily compatible with commercially available photo multiplier tubes.

In preferred form, the entire scintillator 18 is encased in another flexible tubular casing or sheath 22. A product deemed suitable for this purpose is sold by Electri-flex Company of Roselle, Ill. under the trademark LIQUA-TITE®. This material is a spiral-wound metallic conduit that is covered with a water-tight/light-tight plastic sheath. Other types of water-tight/light-tight flexible tubing may also be suitable. A two inch (5 cm) inside diameter flexible casing 22 is appropriate for covering a one inch (2.54 cm) inside diameter scintillator tube 12 and can provide a flex radius as small as 24 inches (60 cm) or less. Threaded couplings 24, 26 specifically designed for use with the material of the outer casing 22 should be attached in a water-tight/light-tight manner at each end. The free end 27 may then be closed with a typical threaded cap 28.

Between the scintillator tubing 12 and the outer casing 22, the flexible tube 12 is wrapped with at least one layer of an appropriate light-reflecting material 30. It has been found that a foil or mirror-finish material is not required. Instead, simply using a white material that provides abrasion resistence for contact between the inner and outer tubes 12, 22 spirally taped in place, is sufficient. An appropriate material has been found to be spunbonded olefin sheet products such as TYVEK® made by DUPONT® Type 14.

Figure 2:
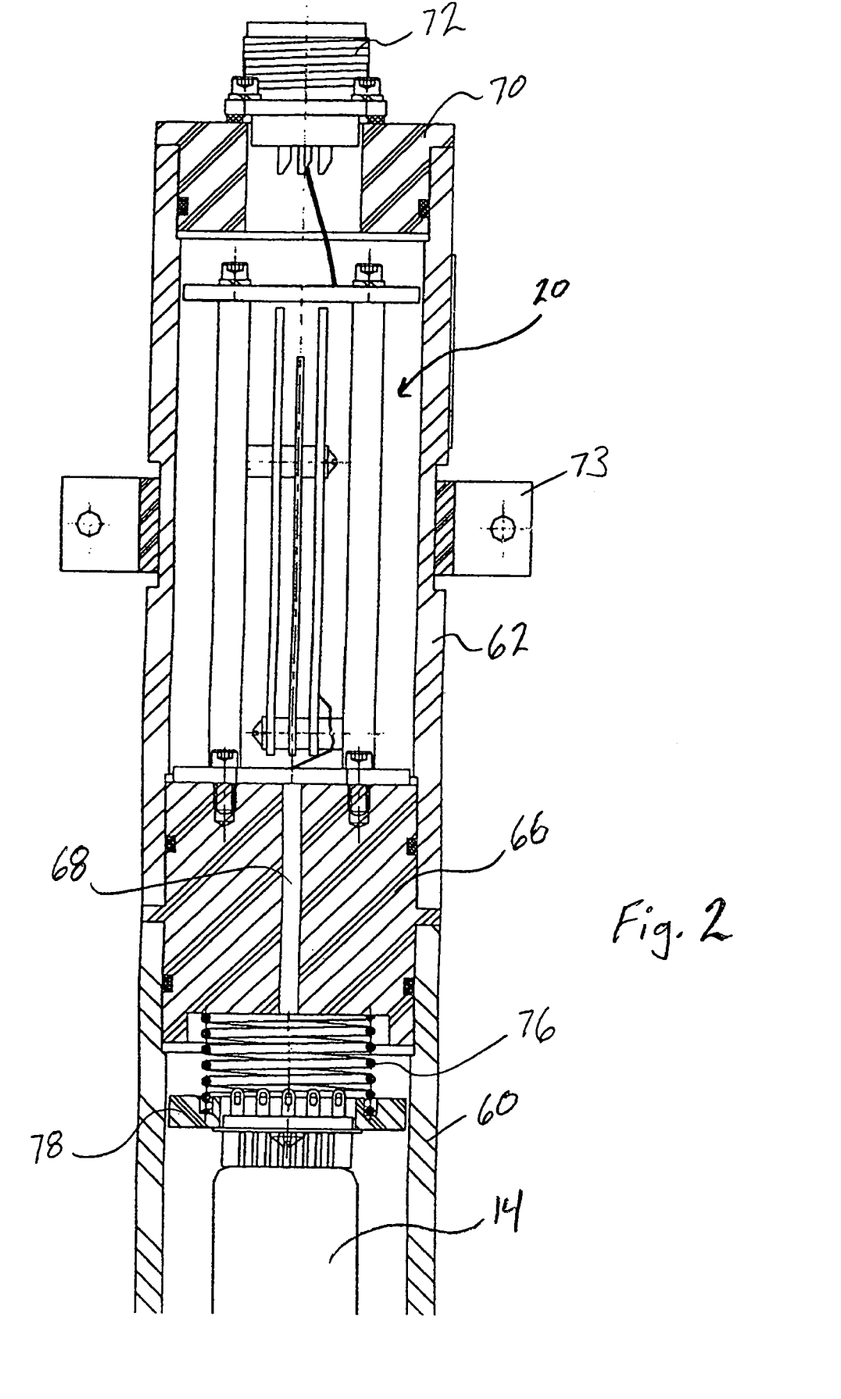
FIG. 2 is a detail longitudinal sectional view showing the detector head housing.
Figure 3:
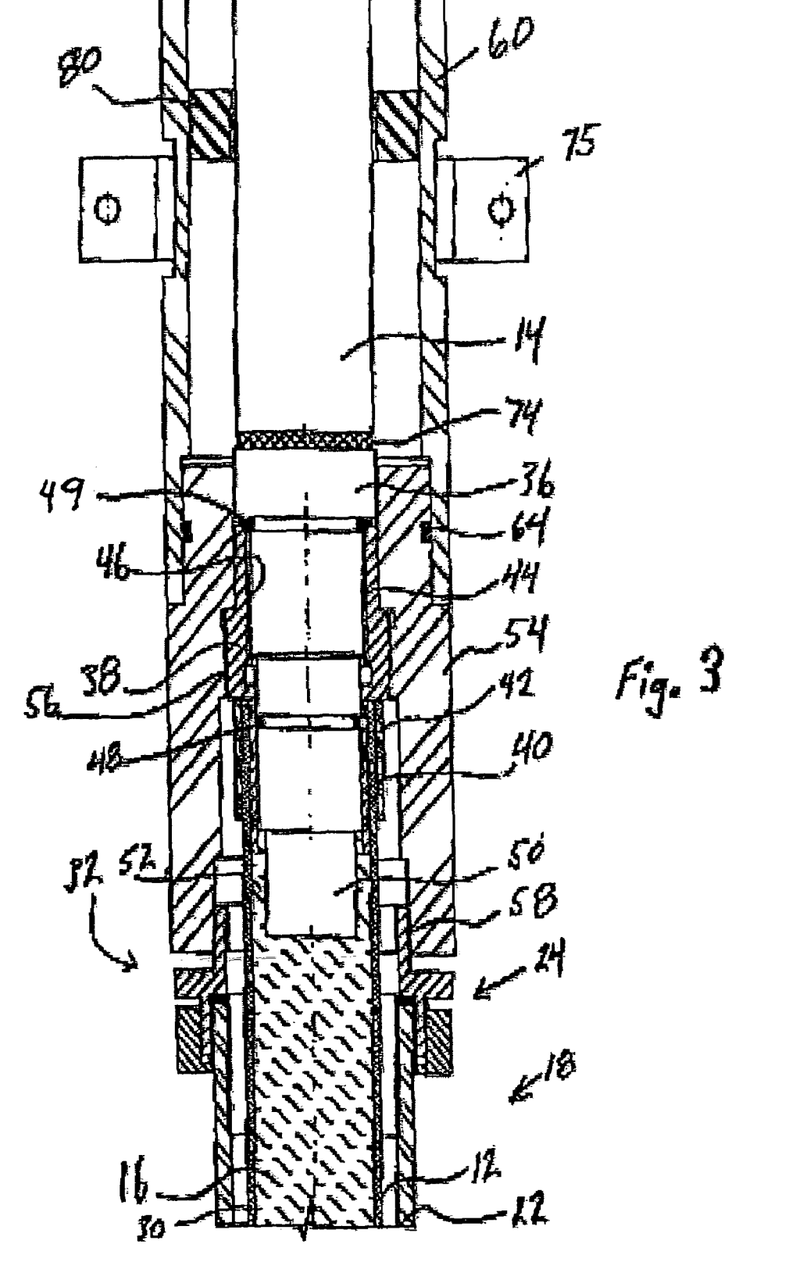
FIG. 3 is a detail longitudinal sectional view of the interface between the flexible liquid scintillator and photo multiplier tube/head according to one preferred embodiment of the present invention.
Figure 4:
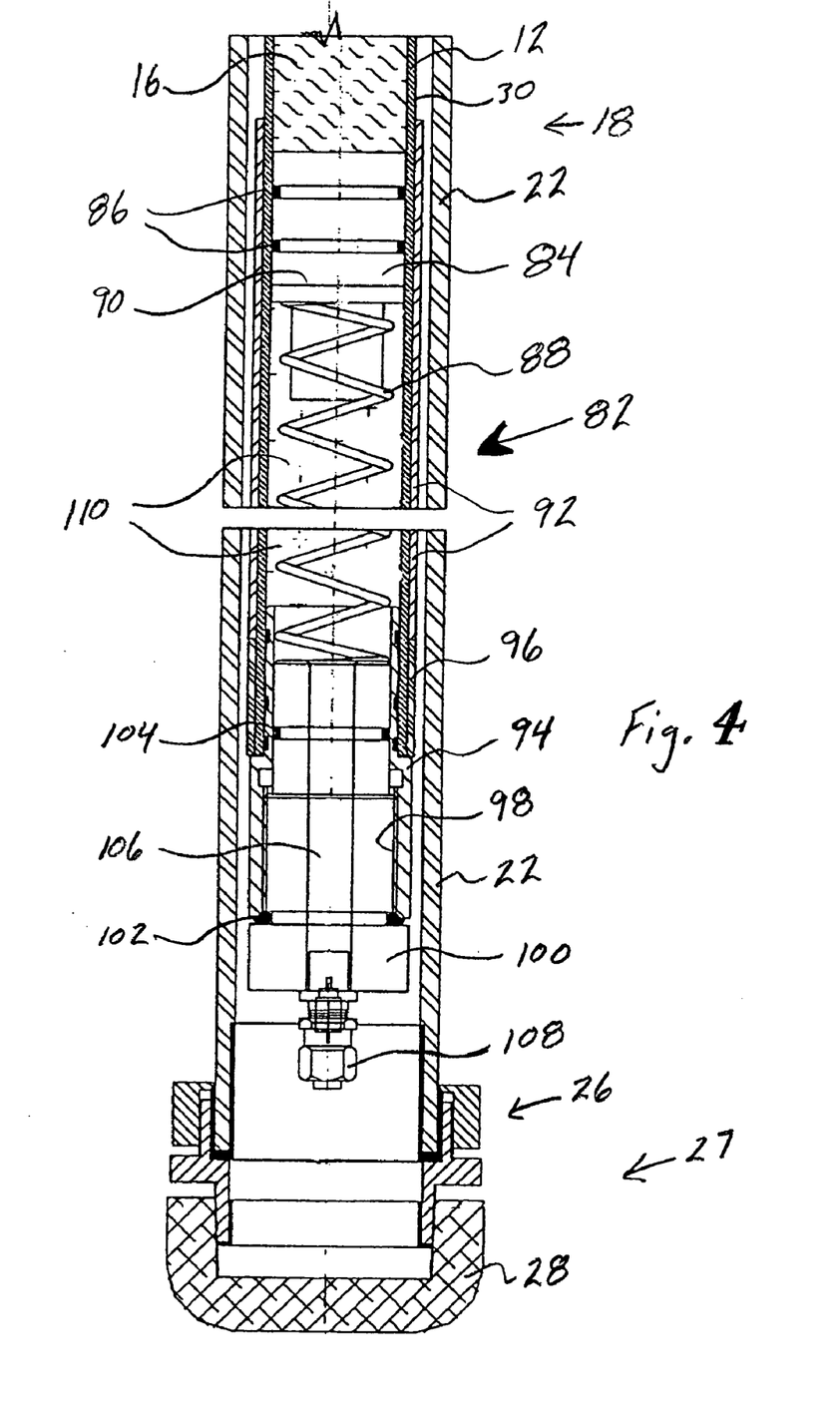
FIG. 4 is a detail longitudinal sectional view showing a variable volume end expansion chamber according to one preferred embodiment of the present invention.

Referring now also to FIGS. 2–4, and particularly to FIG. 3, it can be seen that the detector end 32 of the scintillator 18 is securely closed by an optically transparent plug member 36. This plug member 36 is preferably made of acrylic or similar suitable material such as glass, LEXAN™, or PLEXIGLASS™. The selected material should be chemically inert to the liquid scintillation material 16 and have an index of refraction similar to that of the liquid scintillation material 16.

An end plug mounting member 38 is fixedly joined to the flexible tube 12. This member 38 is preferably turned from stainless steel and includes an end portion 40 which is sized to frictionally engage the inner surface of the flexible tube 12. An attachment ring or collet 42 made of a softer metal, such as copper, is then crimped or swaged into place over the flexible tube 12 to create a secure connection. The mounting member 38 includes an internally threaded portion 44 which engages an externally threaded portion 46 of the transparent end plug 36. Elastomer o-rings 48, 49 provide a seal on both sides of the threaded engagement.

An inner end portion 50 of the transparent closure plug 36 has a reduced diameter portion which may extend axially a length equivalent to at least the inside diameter of the flexible tubing 12. This provides an annular interior chamber 52 in which any minute bubbles may accumulate without significantly degrading the passing of light from the liquid scintillation material 16 through the end plug 36. It is expected that the detector end 32 of the scintillator 18 will be mounted at the highest point of the detector 10 installation. Such mounting is not required and the annular internal chamber 52 may not be necessary if the detector 10 is mounted such that the photo-detection head is always situated at the lowest point of the scintillator 18.

The detector end 32 of the scintillator 18 may be rigidly secured in a head block 54, made of either metal or a suitable polymer material, by a mutual threaded engagement 56. The head block 54 provides a rigid mounting of the detector end 32 of the scintillator 18 that is of sufficient length to protect the seal between the transparent plug 36 and the flexible tube 12 from damage due to over-flexing. The threaded coupling 24 of the outer protective casing 22 may be firmly secured by threaded engagement 58 with the head block 54.

The head block 54 also provides a rigid and water tight connection between the scintillator 18 and housing members 60, 62 that enclose the photo multiplier tube 14 and electronic amplifier 20. A water tight connection between the head block 54 and photomutiplier tube housing 60 is provided by an elastomeric o-ring 64 or other seal. An internal ring 66 connects the housing portions 60, 62 and provides an internal passageway 68 for wiring between the photo multiplier tube 14 and amplifier 20. A water tight end plug 70 closes the end opening of housing 62 and provides the mounting for an industry standard water tight electrical connector 72. If desired, mounting flanges 73, 75 may be used for field installation of the detector housing 60, 62.

An interface between the photo multiplier tube 14 and optically clear end plug 36 may be facilitated with a transparent elastomer disk or pad 74. A preferred silicone elastomer material is SYLGARD® 184 manufactured by Dow Corning. In preferred form, the photo multiplier tube 14 is spring biased to bear against the pad 74 and end plug 36 so that a close contact is constantly maintained. It is also preferred that the photo multiplier tube 14 be spring biased 76 in the axial direction into firm contact with the elastomer pad 74. The spring 76 maintains close operable contact without regard to physical orientation of the device 10, temperature fluctuations, or impact from external forces. One or more centering rings 78, 80 maybe used to maintain lateral alignment of the photo multiplier tube 14 within the housing 60.

The liquid scintillation materials 16 presently available have a relatively high coefficient of thermal expansion. For this reason, volumetric expansion of the liquid scintillation material 16 must be accommodated. Additionally, even at steady temperatures, the total volume of the flexible tube 12 will change, to a lesser degree, as the scintillator 18 is coiled for shipment or bent during installation. If volumetric expansion is not otherwise accommodated, the integrity of the fluoropolymer material of the tube 12 can be compromised and fatigue bubbles or other deformations may be introduced into the wall of the tube 12 which otherwise compromises its desired index of refraction or the internal smoothness of the walls that enhances internal reflection.

Accordingly, referring now particularly to FIG. 4, therein is shown generally at 82 a variable volume expansion chamber means substantially at the free end 27 of the scintillator 18. This may include a piston member 84 sized to slidably fit within the flexible tube 12 and sealed with one or more elastomer o-rings 86 or spring loaded TEFLON seals. The piston member 84 may be spring biased 88 against the liquid scintillation material 16. The piston member 84 is preferably made of acrylic or other transparent material similar to that of the end plug member 36 and includes a foil layer or other light-reflecting material on its surface 90 opposite that exposed to the liquid scintillation material 16.

In order to provide free movement of the piston member 84, an elongated, cylindrical stiffening tube 92, preferably made from stainless steel or aluminum, is placed over a portion of the flexible tube 12, external of the reflective layer 30, to provide a relatively axially straight guide for the piston 84 along a predetermined length portion of the scintillator 18.

The free end 27 of the scintillator 18 is enclosed using a coupler 94 friction swaged into place by a collet 96 in a manner similar to that shown in FIG. 3 for the detector end of the scintillator 18. In preferred form, the coupler is turned from stainless steel material and is internally threaded 98 to receive an end plug member 100 with one or more internal elastomer o-ring seals 102, 104. The end plug 100 provides a solid head against which the spring 88 can bear its axial forces biased against the piston member 84. If desired, the plug 100 may include a central passageway 106 and a valve 108 through which an inert gas, such as nitrogen or argon, may be introduced into the gas chamber 110 behind the piston 84. In this manner, the force of the spring 88 against the piston 84 may be either enhanced or reduced by a adjusting the pressure within this chamber 110.

Figure 6B:
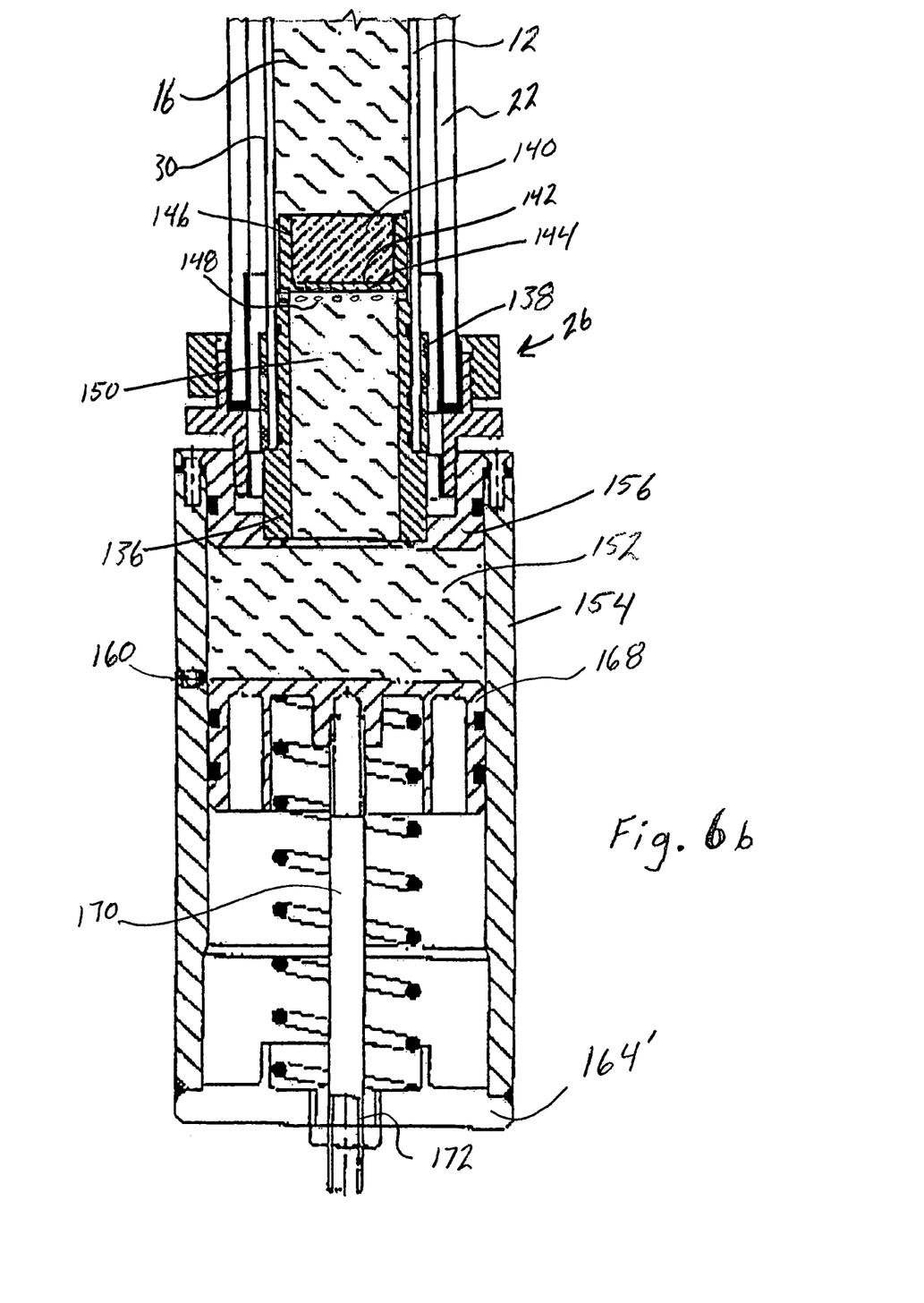
FIG. 6b is a detail longitudinal sectional view showing a variable volume end expansion chamber according to another preferred embodiment of the invention.
Figure 7:
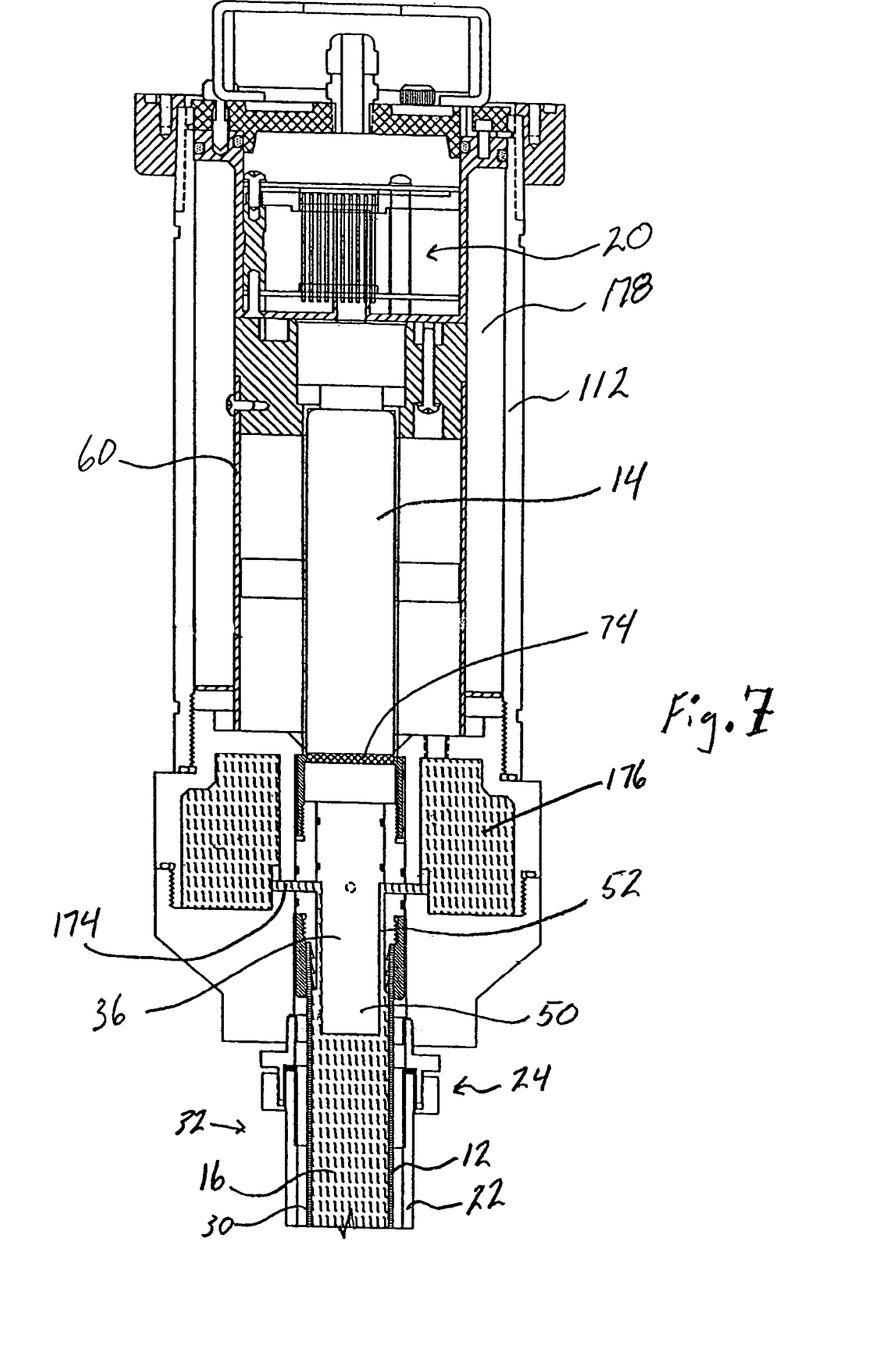
FIG. 7 is a sectional view showing an alternate expansion chamber design.

The volumetric expansion chamber system shown in FIGS. 1 and 4 has been found to be suitable only for use in installations where significant ambient temperature fluctuations do not exist and where the portion of the flexible tube 12 reinforced by the stiffener 92 can be maintained free of lateral forces. For this reason, alternate designs for volumetric expansion chambers, shown specifically in FIGS. 5b, 6b, and 7, are disclosed and will be described in detail below.

Figure 5A:
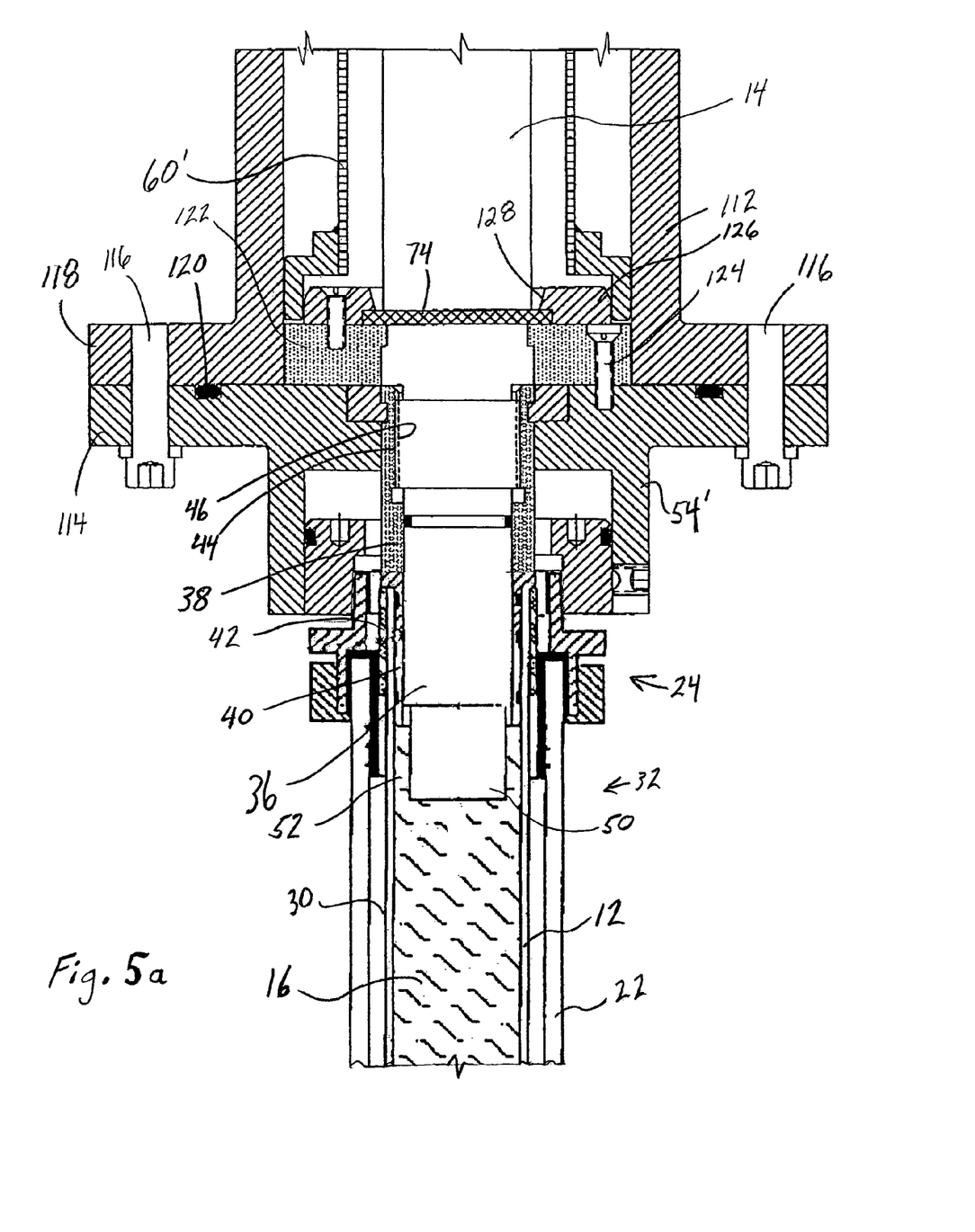
FIG. 5a is a detail longitudinal sectional view showing another preferred embodiment showing a connection between the flexible liquid scintillator and head assembly.
Figure 5B:
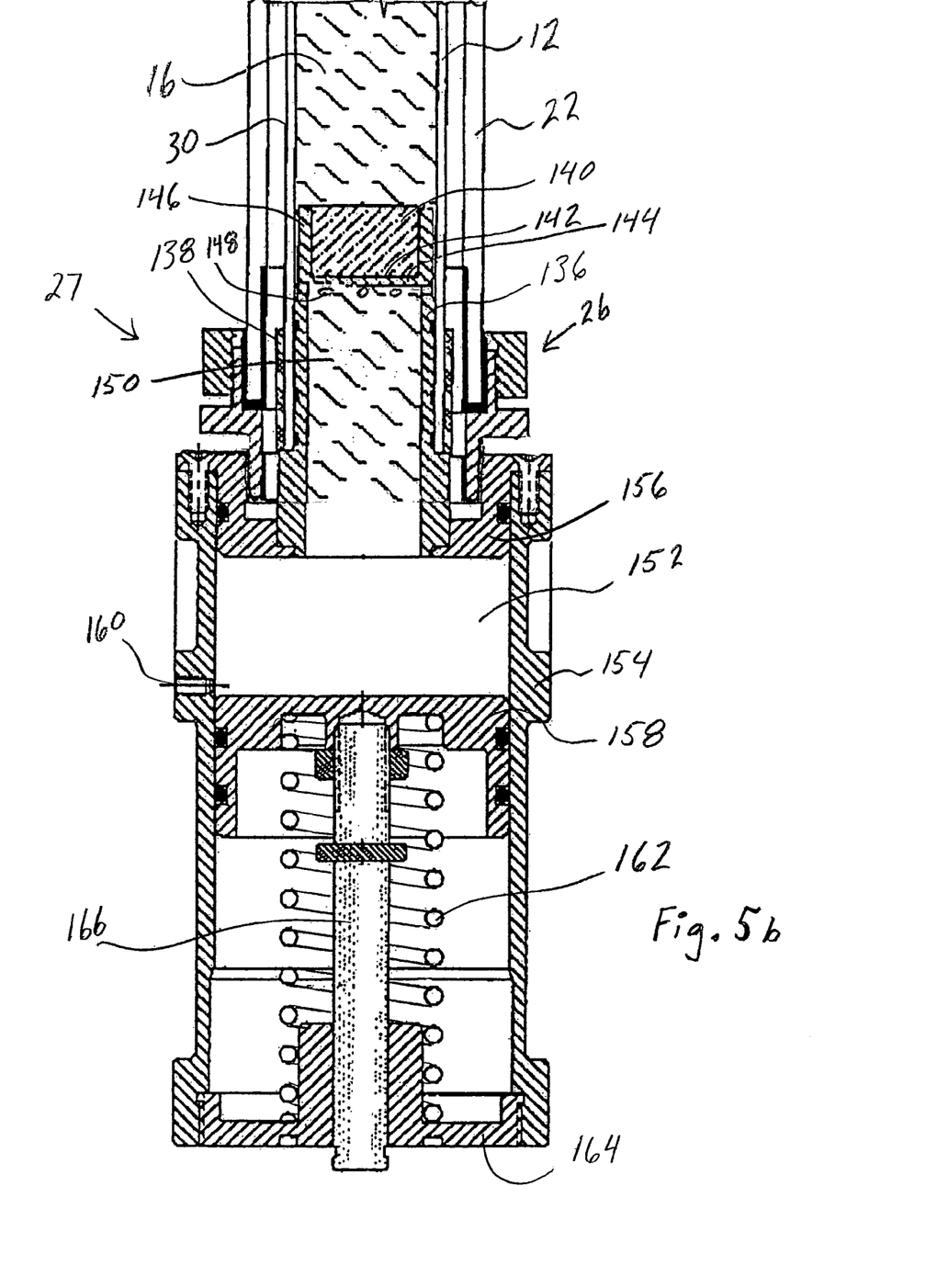
FIG. 5b is a detail longitudinal sectional view showing a variable volume end expansion chamber according to another preferred embodiment of the invention.

Referring now to FIGS. 5a and 5b, therein is shown another preferred embodiment of the present invention. In this embodiment, the construction of the scintillator 18 portion of the device is substantially the same as that shown and described above. Like reference numerals are used to refer to equivalent parts in these figures for simplicity.

FIG. 5a shows a preferred version of the detector head which includes a head block 54' that mates with an external housing 112 that is designed according to industry standards to provide a substantially "explosion proof" enclosure. The head block 54' receives the transparent end plug 36 and couples to the outer casing or sheath 22 in substantially the same way as the first embodiment described above. The head block 54' may include a substantial annular flange 114 that couples via bolts 116 to a flange 118 that is part of the explosion proof outer housing 112. An elastomeric o-ring seal 120 may be provided to include a water tight coupling. Within the outer housing 112 there is an inner housing 60' which encloses the photomultiplier tube 14 and amplifier (not shown in this figure) in substantially the same way that housing parts 60, 62 function in the above-described embodiment.

In this embodiment, the stainless steel coupler 38 and transparent end plug 36 are mounted to the head block 54' with a first annular mounting ring 122 which may be removably bolted 124 in place. The transparent elastomeric disk 74 is mounted to the first annular ring by a second annular mounting ring 126. In preferred form, this ring 126 includes a substantially funnel-shaped opening 128 to guide the photo multiplier tube 14 into place as it is axially inserted, along with the inner housing 60', when the detector head is assembled.

Figure 6A:
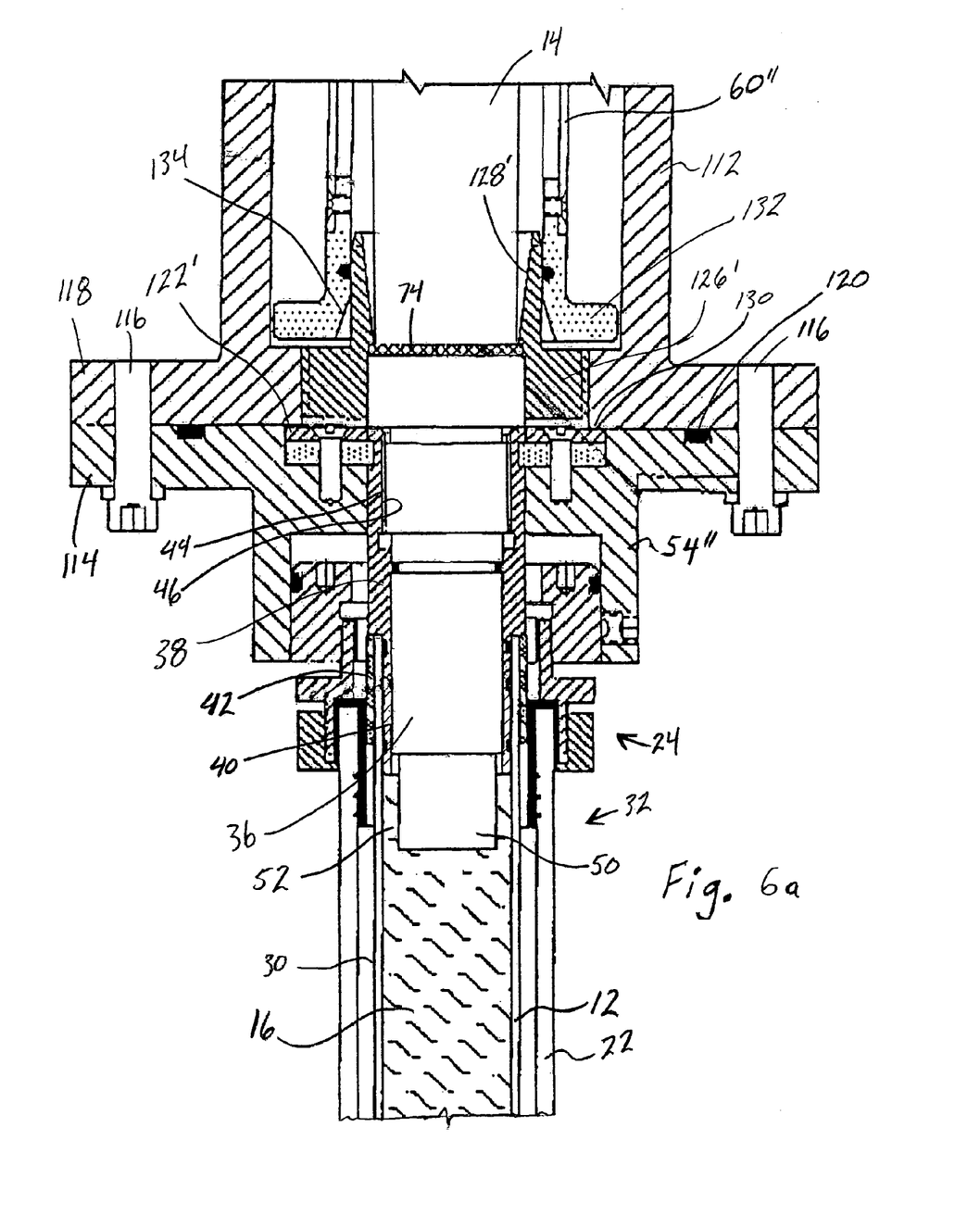
FIG. 6a is a detail longitudinal sectional view showing another preferred embodiment showing a connection between the flexible liquid scintillator and head assembly.

FIG. 6a shows a design similar to that shown in FIG. 5a, with some variation in the manner of attachment between the coupling 38 and transparent end plug 36 to the head block 54". In this embodiment, a first mounting ring 122' secures the coupling 38 to the head block 54". Attachment of the outer housing 112 to the head block 54" further secures this mounting due to the overlapping position of an inner flange 130. The second annular mounting ring 126' includes an axially-elongated guide funnel 128' to receive the axially-inserted photo multiplier tube 14 and to retain the transparent elastomer cushion 74 in place against the transparent end plug 36. An end member 132 for the inner housing 60" includes external flange portions for correctly positioning it within the outer housing 112 and an internal bevel 134 to help guide it in place around the second annular ring 126' during assembly.

FIGS. 5b and 6b show alternate volumetric expansion systems. In each of these preferred embodiments, an expansion chamber is provided that is external to the flexible tube 12 and, therefore, may be less susceptible to malfunction.

Referring to FIG. 5b, the free end of the flexible tube 12 is secured to a coupling 136 made of stainless steel or similar material and sized to friction fit the internal circumference of the flexible tube 12. The coupling is then secured by an outer collet 138 made of copper or similar relatively softer material that is crimped or swaged into place. The coupling 136 includes a plug 140 of acrylic or similar material bonded in place over a reflective film or disk 142 against an end wall 144. An end portion 146 of the coupling 136 is reduced in diameter to allow an annular bypass of liquid scintillation material 16 around it and to be in fluid communication with a series of radial openings 148 in the coupling 136. These radial openings 148 allow fluid communication between the interior of the flexible tube 12 and an interior passageway 150 of the coupling 136. This passageway, in turn, leads to a variable volume expansion chamber 152.

The expansion chamber 152 is defined by a cylinder housing 154, a closure head 156, and an axially moveable piston member 158. Both the coupling member 136 for the flexible tube 12 and the coupling 26 for the outer casing 22 attach to the head member 156. The cylindrical housing 154 may be provided with a bleed hole 160 to the expansion chamber 154. The piston 158 is spring biased 162 against the liquid scintillation material 16 in the expansion chamber 52. The spring 162 is held in place by annular guides formed in the piston 158 and closure head 164. A guide rod 166 may also be provided which allows the piston 158 to be locked in an axial position while the scintillator 18 is being filled. After the entire internal chamber of the flexible tube 12 and expansion chamber 152 have been filled, any remaining gas bubbles are bled off and the guide rod 166 is released to allow the piston 158 to float freely as the liquid scintillation material 16 expands or contracts.

Referring now to FIG. 6b, an alternate piston design 168 is shown. Additionally, it is provided with a guide rod 170 that may be threaded 172 in place in the second head closure member 164' for filling of the scintillation chamber. Thereafter, the guide rod 170 is completely removed and may be replaced with a simple threaded plug (not shown). In this manner, the potential for undesired friction or seizing caused by the guide rod 170 is eliminated. Additionally, it becomes unnecessary to cover and protect the otherwise exposed end of a dynamic guide rod, such as may be the case with guide rod 166 shown in FIG. 5b.

Referring now to FIG. 7, therein is shown an alternate design for a volumetric expansion chamber positioned adjacent to or integral with the detector head portion of the device 10. In this embodiment, the annular chamber 52 around the reduced diameter portion 50 of the transparent end plug 36 is provided fluid communication, through multiple radial passageways 174, to a first annular expansion chamber 176. This design may be particularly useful for an installation where access to the free end 27 of the scintillator 18 is limited or space-restrained.

It has been found that extreme ambient temperature fluctuations, in addition to causing thermal expansion and contraction of the liquid scintillator material 16 can cause performance fluctuations requiring appropriate measures for compensation. First, when the device is expected to be exposed to relatively low temperatures, use of a heat blanket may be useful for maintaining performance stability of the electronic components (photo multiplier tube and amplifier). In preferred form, an electric heat blanket (not shown) may be situated in the annular space 178 between the inner housing 60, 60', 60'' and the outer explosion proof housing 112 (See FIGS. 5a, 6a, and 7). Preferably, the heat blanket is set to maintain a constant temperature of approximately 50° C.

Conversely, if the device 10 is to be used in an installation where it will be exposed to widely varying ambient temperatures, performance can be affected when temperatures shift to a higher range. For example, the length of the scintillator 18 can collect a significant amount of heat when exposed to prolonged direct sunlight. This heat is rapidly transferred through the liquid scintillation material 16 and the closure plug 36 to the photo multiplier tube 14. Because such levels of heat do not harm the electronic components of the device 10, but rather merely affect output, it is far simpler to compensate for this shift electronically, rather than trying to physically cool the electronic components. On the other hand, using available electrical energy to heat the components when necessary, is relatively easy. By using an internal temperature sensor, commonly already found in the detector head circuitry, simple alteration of software and/or hardware to compensate for high temperature output shift will insure proper linear performance of the device when measuring tank levels and the like. The exact configuration of a compensation program is within the ordinary skill of one in the art.

The embodiment shown is that which is presently preferred by the inventors. Many variations in the construction or implementation of this invention can be made without substantially departing from the scope of the invention. For this reason, the embodiments illustrated and described above are not to be considered limitive, but illustrative only.

What we claim is:

1. A flexible scintillation-type radiation detector for use in combination with a source of nuclear radiation as a level sensing gauge, comprising:
    an elongated flexible tube having first and second closed ends and defining therein a scintillation chamber;
    liquid scintillation material substantially filling the scintillation chamber;
    said first closed end including a substantially optically-transparent first end closure member;
    photodetection circuitry operably positioned relative to the first end closure member to quantitatively detect scintillating photons generated in the scintillation liquid indicative of radiation passing into the scintillation chamber;
    an opaque, flexible protective sheath substantially surrounding the flexible tube;
    further comprising an expansion chamber for accommodating volumetric expansion of the liquid scintillation material; and
    wherein a slidable piston member is operably positioned in the scintillation chamber to define a variable volume expansion chamber free of liquid scintillation material adjacent to the second end.

2. The detector of claim 1, further comprising a stiffener to maintain a portion of the scintillation chamber in which the piston slidably moves to substantially prevent bending thereof.

3. The detector of claim 1, further comprising a spring positioned to bias the piston toward the scintillation liquid.

4. A flexible scintillation-type radiation detector for use in combination with a source of nuclear radiation as a level sensing gauge, comprising:
    an elongated flexible tube having first and second closed ends and defining therein a scintillation chamber;
    liquid scintillation material substantially filling the scintillation chamber;
    said first closed end including a substantially optically-transparent first end closure member;
    photodetection circuitry operably positioned relative to the first end closure member to quantitatively detect scintillating photons generated in the scintillation liquid indicative of radiation passing into the scintillation chamber;
    an opaque, flexible protective sheath substantially surrounding the flexible tube; and
    an expansion chamber for accommodating volumetric expansion of the liquid scintillation material;
    wherein the expansion chamber has a variable volume, the chamber being external of and in fluid communication with the flexible tube and including a movable wall therein; and
    further comprising a spring means positioned to bias the movable wall toward the liquid scintillation material.

5. A flexible scintillation-type radiation detector for use in combination with a source of nuclear radiation as a level sensing gauge, comprising:
    an elongated flexible tube having first and second closed ends and defining therein a scintillation chamber;

liquid scintillation material substantially filling the scintillation chamber;

said first closed end including a substantially optically-transparent first end closure member;

photodetection circuitry operably positioned relative to the first end closure member to quantitatively detect scintillating photons generated in the scintillation liquid indicative of radiation passing into the scintillation chamber;

an opaque, flexible protective sheath substantially surrounding the flexible tube; and an expansion chamber for accommodating volumetric expansion of the liquid scintillation material;

wherein the expansion chamber has a variable volume, the chamber being external of and in fluid communication with the flexible tube and including a movable wall therein; and further comprising a member positioned to selectively immobilize the movable wall in a fixed position.

* * * * *